C. M. WILSON.
VEHICLE LAMP.
APPLICATION FILED OCT. 7, 1916.
1,259,816.
Patented Mar. 19, 1918.
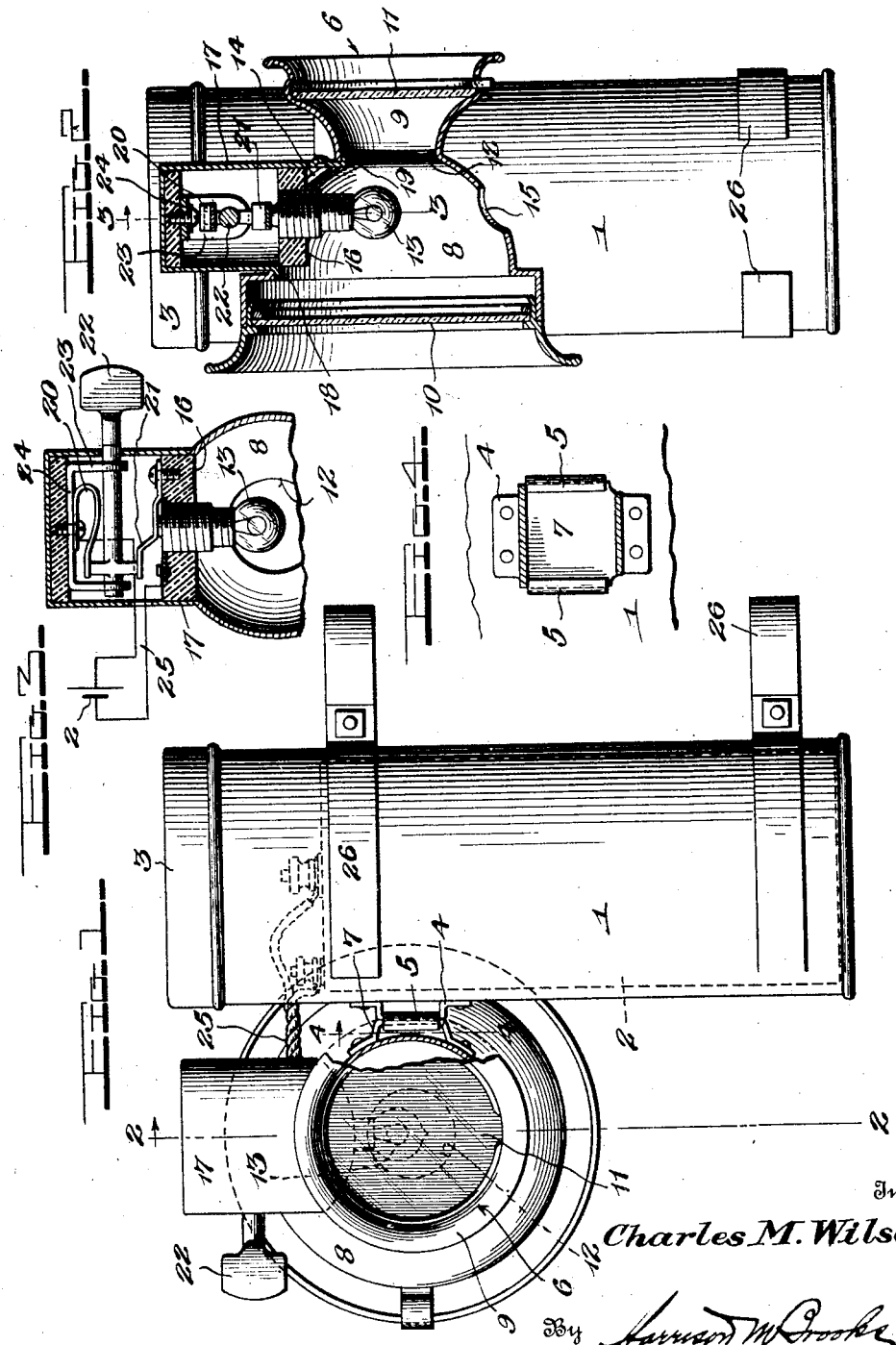
Inventor
Charles M. Wilson,
By
Attorney

UNITED STATES PATENT OFFICE.

CHARLES M. WILSON, OF ELMIRA, NEW YORK.

VEHICLE-LAMP.

1,259,816.  Specification of Letters Patent.  Patented Mar. 19, 1918.

Application filed October 7, 1916. Serial No. 124,305.

*To all whom it may concern:*

Be it known that I, CHARLES M. WILSON, a citizen of the United States, residing at Elmira, in the county of Chemung and State of New York, have invented certain new and useful Improvements in Vehicle-Lamps, of which the following is a specification.

The primary object of this invention is to provide an improved vehicle lamp especially adapted for bicycles, motorcycles, and like conveyances, and embodying, in its entirety, a source of electrical energy so that the device may readily be attached at a desired point and removed for use as a flashlight.

Further, the invention resides in the provision of vehicle lamp of simple, compact and durable construction embodying a forward white glass and a rear red pane to meet the requirements of the law.

A further and very important aim is to provide a compact arrangement in which the parts may readily and facilely be assembled or removed, possessing no external wires to become entangled, and providing an interlocking association between the parts for insuring proper and efficient operation under hard usage and varying circumstances.

Briefly, the invention involves the use of a battery case, a slidably engaged reflector part on the side thereof, and an interlocking lamp supporting member carried by the case and reflector, whereby the lamp supporting member may be removed from the reflector, the latter then removed from the battery case, or the reflector demounted while the lamp supporting member is in its operative position on the reflector.

The invention further resides in the features of construction, and the novel arrangements and combination of parts hereinafter described in detail, succinctly defined in the appended claims, and clearly illustrated in the annexed drawing in which Figure 1 is a rear elevation of my improved vehicle lamp having a part omitted;

Fig. 2 is a side elevation thereof with the reflector part in vertical section;

Fig. 3 is a transverse vertical section through the reflector part which latter is shown in fragment; and Fig. 4 is a detailed section on line 4—4 of Fig. 1 showing the separable bracket connection between the reflector part and the battery case.

Referring to corresponding parts by like characters of reference, the numeral 1 denotes a battery case in which an ordinary dry cell of sufficient strength is arranged, access being had to the cell 2 through the opened top normally closed by the cover 3.

Numeral 4 designates a stationary clip or bracket fixed to the side of the case and provided with opposing edge guides 5 bent outwardly therefrom.

The reflector part 6 is provided with a tongue 7 braced outwardly therefrom to slidably engage between the guides 5 and the body of the clip whereby said reflector part is removably secured to the battery case and is removable therefrom by upward movement. The reflector part comprises a forwardly directed concave reflector 8 and a rearwardly directed convex or bell-shaped reflector 9 of comparatively smaller dimensions. In the front end of the reflector part is arranged a clear glass 10 and across the smaller reflector is secured a covering 11 of red glass. The reflectors are communicatively joined by a small neck 12 through which shine the light rays from an electric bulb or lamp 13 arranged in the forward reflector 8. The tongue 7 is mounted on the reflector part adjacent the neck 12 whereby said part will lie close to the battery case and not project unduly therefrom. This arrangement affords a neat compact structure in which the reflector part may be readily removed for the purpose of cleaning, repair, and other obvious reasons.

The reflector part is provided in its forward reflector 8 with a top opening 14 and a coinciding bottom opening 15 through which latter the rays of light from lamp 13 may be directed onto a license plate to display the number.

The light or lamp is mounted in an inverted manner whereby the full benefit of the light energy is obtainable, said lamp being supported on a base 16 which also serves to close the lower end of the switch socket casing 17, the latter being connected to the reflector part in any suitable manner whereby it may be removed. The connection here shown comprises a fixed flange or lip 18 on the forward side of said casing, to engage the inner face of the forward reflector, and a spring or yieldable catch 19 engageable with the inner periphery of the neck 12.

The switch comprises spaced contacts 20 and 21 connectible in an electrical manner by the key 22 which is journaled in the arms 23 of U-shaped bracket 24. The latter supports the spring contact 20 and is secured in the top of the socket casing 17. The contacts and lamp base are connected to the terminals or posts of cell 2 by the conductors 25 which lead through opposing openings in the side walls of the battery case and socket casing and constitute a flexible or hinged connection between the last two elements.

Thus, the flexible connection 25 permits of the socket being removed from the reflector part as well as permitting the latter being removed from the case while the socket is in operative position thereon. The connectors, while permitting the bodily removal of the socket and reflector part from the case, are so arranged as to limit quick upward movement of tongue 7 in guide bracket 4 and thereby prevent accidental dislodgment of the reflector part from the case, the conductors engaging with the edges of the openings in the case and casing.

The invention is especially adapted for bicycles, motorcycles, and wagons, although it is obvious that the same may be mounted on other vehicles and otherwise utilized. For mounting the device on bicycles, brackets 26 are provided to adjustably embrace the battery case, as is apparent, said brackets having parts for engaging the front fork or other part of the bicycle frame.

The rear reflector being convex further tends to distinguish the head and tail light rays since the latter are not concentrated as they would be by a concave reflector.

The parts are easily assembled and disassembled and any part may be readily replaced without removing the case 1.

The drawing illustrates my preferred form of the invention although it is understood that such modifications as the scope of the appended claims will permit may be resorted to in the manufacture of the lamps.

In their manufacture, it will be noted that the individual parts are separately constructed and yet when assembled, a compact structure is provided in which the battery, lamp and case are embodied, this obviating the running of wires along the frame of the bicycle as is the manner when the battery is distantly arranged from the lamp. Through this compact arrangement, the jars in hard usage are more easily encountered and with less likelihood of breakage. The wires being insulated no loss of energy is obtained, especially in view of the fact that no current passes through the reflector or other part of the casing, which latter usually serves as a ground in lamps on the market. No special arrangement of the battery in the case is necessary since the wires are sufficiently long to be fastened to the binding posts of the cell.

It will be further noted, that the lamp base or supporting member, the switch base, and the lamp socket support are all comprised in one member thereby simplifying the construction to a practical degree which materially facilitates the assembling of the parts.

What I claim is:—

1. A vehicle lamp comprising a battery case, a fixed bracket on the outside thereof, a reflector part slidably and rigidly engaged with the bracket, and a combined light and switch socket detachably and rigidly secured to the reflector part.

2. A vehicle lamp comprising a cylindrical battery case having a removable top, a bracket fixed on the outer wall of the case, and a reflector part consisting of a forwardly directed reflector and a smaller rearwardly directed reflector joined to the former by a neck portion, the reflector part being supported from said neck portion by the bracket whereby to provide a close fitting structure.

3. A vehicle lamp comprising a battery case, a bracket carried thereby, a reflector part engageable with the bracket and removable therefrom by upward movement, said reflector having an opening through its upper portion, and a light supporting member arranged in the opening of said reflector.

4. In combination, a battery case, a reflector removably secured to the outside of said case, and a lamp supporting member arranged alongside the case exteriorly of the reflector and detachably connected to the latter.

5. In a vehicle lamp, a battery case having a removable closure, a reflector detachably and rigidly secured on the side of said case, a lamp socket supported by the reflector alongside the case, and conductor wires leading from the battery case through the opposing side walls of the socket and case.

6. In a vehicle lamp, a case, a bracket on the outside thereof, said case having an opening above the bracket in its side wall, a reflector slidably engaged with the bracket to be rigidly carried thereby, and a lamp supporting member supported by the reflector opposite to the case opening and including conductor wires extended through the opening of the case.

7. A vehicle lamp comprising a reflector having a lamp receiving opening, a casing removably secured over the opening of said reflector, a lamp support therein, a switch in the casing, a battery case supporting the reflector on its side, and conductors passing through the opposing sides of the casing and case to the switch.

In testimony whereof I affix my signature.

CHAS. M. WILSON.

Copies of this patent may be obtained for five cents each, by addressing the "Commissioner of Patents. Washington, D. C."